United States Patent [19]

Schwerdt

[11] Patent Number: 4,927,123

[45] Date of Patent: May 22, 1990

[54] ELASTIC SLEEVE SPRING WITH REINFORCEMENT BODIES FOR INCREASED STIFFNESS

[75] Inventor: Hans-Werner Schwerdt, Laudenbach, Fed. Rep. of Germany

[73] Assignee: Firma Carl Freudenberg, Weinheim, Fed. Rep. of Germany

[21] Appl. No.: 279,663

[22] Filed: Dec. 5, 1988

[30] Foreign Application Priority Data

Dec. 5, 1987 [DE] Fed. Rep. of Germany ....... 3741260

[51] Int. Cl.$^5$ ......................... F16M 5/00; F16F 13/00
[52] U.S. Cl. ............................. 267/140.1; 267/140.2; 267/293
[58] Field of Search .................. 267/219, 140.1, 141.2, 267/276, 281, 293, 104.4, 140.1 C, 104.2; 180/300, 312; 248/559, 562, 636, 638; 188/378, 380

[56] References Cited

U.S. PATENT DOCUMENTS

4,588,174  5/1986  Konishi .

FOREIGN PATENT DOCUMENTS

0208650 10/1985  Japan .................... 267/219
0010138  1/1986  Japan .................... 267/140.1
0118133  5/1987  Japan .................... 267/140.1

*Primary Examiner*—Robert J. Oberleitner
*Attorney, Agent, or Firm*—Kenyon & Kenyon

[57] ABSTRACT

A hydraulically damped elastic sleeve spring comprises an inner tube, an outer tube enclosing the former at a radial spacing and a spring body of rubber or similar elastic material that is adhesively connected to the tubes in the gap formed therebetween. The spring body comprises a partition forming at least two chambers disposed one behind the other with respect to the plane in which the force to be damped is applied. The chambers are separated by the partition, filled with liquid and connected to each other via at least one choke opening. The partition may comprise two sections that bridge the gap on both sides of the inner tube in a direction essentially transverse to the force application direction. At least one of the partition sections is stiffened against transverse displacement by a reinforcement body that may be formed as a column. The reinforcement body may extend at a radial distance from the inner and the outer tubes parallel to the longitudinal extent of the tubes.

13 Claims, 2 Drawing Sheets

ELASTIC SLEEVE SPRING WITH REINFORCEMENT BODIES FOR INCREASED STIFFNESS

BACKGROUND OF THE INVENTION

The invention generally relates to a hydraulically damped elastic sleeve spring and more particularly to such springs that may be used as engine supports in a motor vehicle.

A hydraulically damped elastic sleeve spring comprising an inner tube, an outer tube surrounding the inner tube with a radial spacing and a rubber spring body radially compressed in the gap formed by the radial spacing between the inner and outer tubes wherein the spring body comprises a partition forming two liquid filled chambers disposed behind each other in the direction of application of the force to be damped and connected together by at least one choke opening and wherein the partition comprises two sections that bridge the gap on both sides of the inner tube in a direction essentially transverse to the force application direction is disclosed in DE-OS No. 3343392. Such a spring may be used as an engine support for a motor vehicle and ensures, besides isolating the engine-excited high-frequency vibrations, a relatively good damping of the low-frequency vibrations caused as the motor vehicle travels over unevenesses in the road. These low-frequency vibrations can lead to, in the worst case, increased-amplitude vibrations of the engine.

Independently of the magnitude of the amplitude of such vibrations, the forces released in this process act predominantly in the vertical direction. This is taken into consideration in the sleeve spring disclosed in DE-OS No. 3343392 by the fact that in the vertical direction, a damping device and end stops for limiting the vibration amplitude are provided. On the other hand, neither a damping device nor an end stop are provided for vibrations occurring transverse to the vertical force application direction. This may result in relatively large displacements of the engine in the transverse direction, especially when the vehicle is negotiating curves.

The invention is directed to the problem of providing a elastic sleeve spring that can better suppress transverse vibrations, yet still be of a simple design and have spring and damping properties in the vertical direction that are at least as good as those attainable with the rubber sleeve spring disclosed in the above-mentioned German patent publication.

SUMMARY OF THE INVENTION

The invention solves this problem by providing a hydraulically damped elastic sleeve spring comprising an inner tube, an outer tube surrounding the inner tube at a radial spacing to form a gap therebetween, a spring body that may be formed of rubber adhesively connected to the inner tube and the outer tube in the gap wherein the spring body comprises a partition forming at least two chambers disposed behind each other with respect to the direction in which force to be damped is applied, a liquid in the chambers and at least one choke opening connecting the chambers in fluid communication. The partition comprises two sections that bridge the gap on both sides of the inner tube in a direction essentially transverse to the force application direction. A reinforcement body is arranged at a radial distance from the inner tube and the outer tube to stiffen at least one of the partition sections.

In the elastic sleeve spring of the invention at least one of the partition sections is stiffened against transverse displacement by at least one reinforcement body that is arranged at a radial distance from both the inner and the outer tubes. The reinforcement body has a greater hardness than the rubber or elastic material that may comprise the spring body partition section whereby the subsection is given additional stiffness that is predominantly effective in the transverse direction. The transverse direction coincides, during the intended use of the sleeve spring as an engine support, with the transverse direction of the motor vehicle to substantially reduce the magnitude of the relative transverse displacements of the corresponding engine when the vehicle is negotiating curves at high speeds. In the vertical direction, however, only bending stresses in the area of the partition sections are effective. The reinforcement body does not present a noticeable resistance to the former, for instance, when it is centrally mounted at the profile of the section. In this manner, the spring and damping behavior of the sleeve spring of the invention is largely unchanged with respect to the damping performance of oscillating forces introduced in the vertical direction that can be attained with the sleeve springs of the prior art.

The reinforcement body can have basically any desired shape, for instance, a sphere that is pressed into at least one recess of the partition that extends parallel to the longitudinal direction of the sleeve spring to expand the spring drastically. The arrangement and design, however, should be chosen such that, as far as possible, no asymmetrical stiffening of the partition is obtained in the longitudinal direction of the sleeve rubber spring. Thus, if only a single sphere is used along the longitudinal direction of the sleeve spring, the sphere therefore should be advantageously positioned at the longitudinal axis of the sleeve spring. Besides stiffening of the sleeve spring in the transverse direction, in this particular arrangement a certain amount of angular mobility of the inner tube relative to the outer tube in the transverse direction results. This effect may be of great advantage for some special applications.

However, for most applications, an embodiment is preferred that suppresses corresponding angular displacements of the inner tube relative to the outer tube. This is achieved by providing a reinforcement body comprising at least two subbodies disposed along the longitudinal axial direction, with one on each side of the longitudinal axis of the sleeve spring. The effectiveness of the suppression of angular displacements of the inner tube relative to the outer tube increases as the distance between the subbodies and longitudinal axis increases. For this reason it is advisable, if mutually isolated subbodies are used, to attach the subbodies as far radially outward as possible in the region of the end-faces of the partition. The subbodies may be contained, for instance, in blind holes of the partition sections. With this construction, a relatively stable relationship is obtained even if high-frequency vibrations are introduced.

A similar effect can be achieved, with reduced assembly costs, by using a column-shaped reinforcement body that extends parallel to the inner and outer tubes along the length thereof.

Advantageously, such a reinforcement body may be arranged in the interior of the profile of the partition section by, for instance, pressing it into a recess in the section that thereby elastically widens. The resulting mutual contact area between the reinforcement body and the recess is relatively large whereby a sufficiently stable connection between the abutting recess and reinforcement body surfaces is obtained in the axial direction with a relatively small pressure. Thereby, the use of secondary securing measures for the reinforcement body may be omitted in customary applications.

The elastic widening of the recess by the subsequently pressed-in reinforcement body results in an internal pre-tension in the area of the partition section surrounding the recess that depends on the amount of widening and therefore on the size of the reinforcement body. The widening causes a reduction in the elastic resiliency of the partition. This resiliency and therefore, the resiliency of the finished sleeve spring, can be fine-tuned by the appropriate selection of the diameter of the reinforcement body pressed into the recess. If the spring behavior of the sleeve spring is unsatisfactory, it is no longer necessary to replace the entire spring, but rather it is sufficient to replace the reinforcement bodies with bodies of a different diameter.

The reinforcement body and the partition section can be fixed to each other by use of a supplementary adhesive substance or, alternatively, by directly vulcanizing the reinforcement body in the partition section. This possibility is of great importance with respect to guaranteeing a precise mutual correlation between the reinforcement body and the subsection.

In order to decrease the weight of the spring, it may be advisable to form the reinforcement body as a tubular shape. The reinforcement body may comprise a hard material, such as metal.

For applications in motor vehicles it has been found practical to stiffen both partition sections with reinforcement bodies. The partition sections, as well as the reinforcement bodies, may be arranged with mirror symmetry with respect to the plane in which to force to be damped is applied.

The elastic sleeve spring of the invention is of extremely simple design, yet has great practical value and in long-time use, no substantial changes in its damping properties occur.

DETAILED DESCRIPTION

Figure 1:
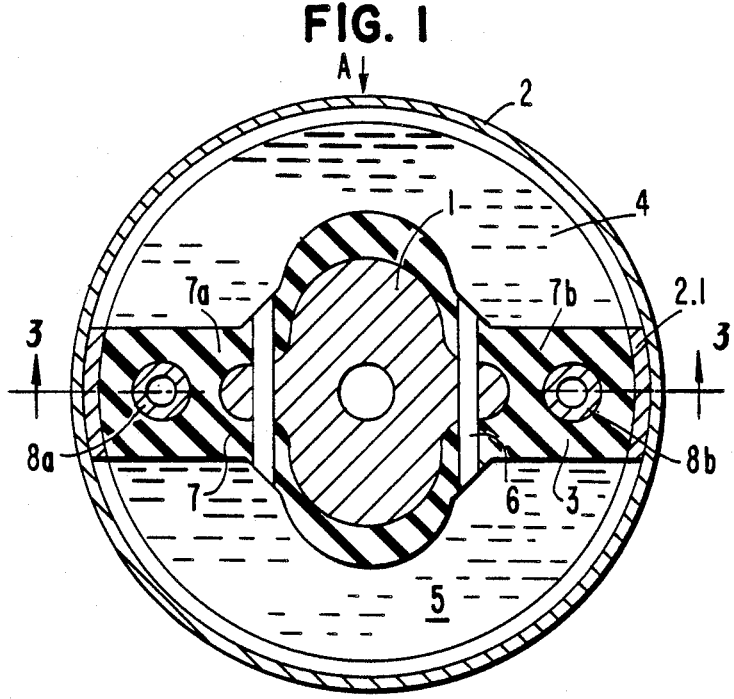
FIG. 1 shows a cross-sectional view of an elastic sleeve spring constructed according to the principles of the invention.
Figure 2:
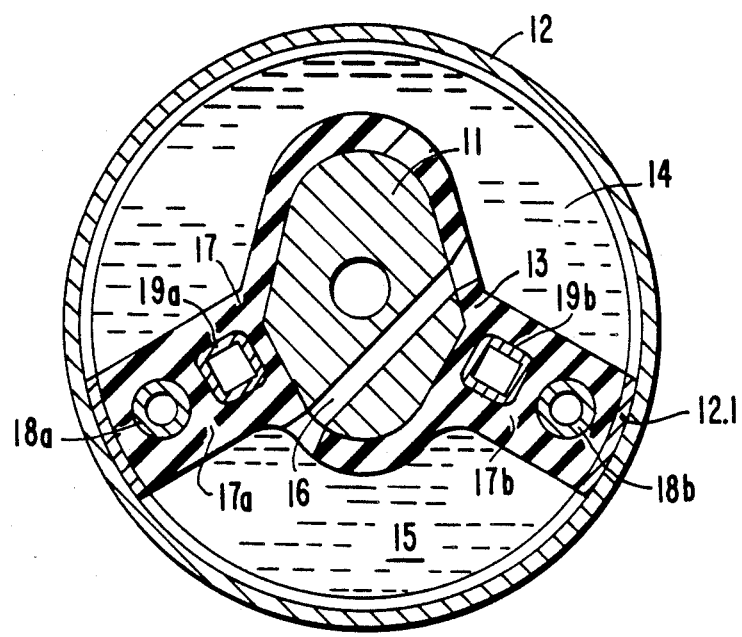
FIG. 2 shows a cross-sectional view of another embodiment of an elastic sleeve spring constructed according to the principles of the invention.
Figure 3:
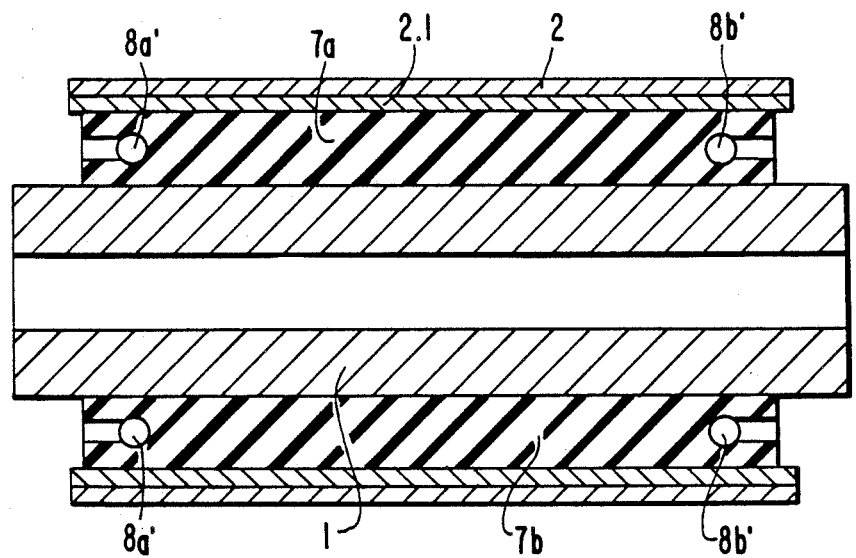
FIG. 3 shows a typical longitudinal sectional view of an elastic sleeve spring constructed according to the invention in which a further embodiment of reinforcement bodies is illustrated.

The sleeve springs shown in FIGS. 1, 2 and 3 each comprise an inner tube 1,11 an outer tube 2,12 surrounding the inner tube with radial spacing and a spring body 3,13 formed of rubber or other suitable elastic material that is arranged in the gap formed by the radial spacing. The spring body 3,13 may be adhesively connected between the inner tube 1,11 and the outer tube 2,12 during the vulcanization process. The outer tube 2,12 surrounds a window tube 2.1, 12.1 formed with cut-outs or windows that are shown in FIGS. 1 and 2 by virtue of the portions of tube 2.1, 12.1 that are not cross-hatched. The cut-outs extend along the longitudinal axis of sleeve spring. The spring body forms two chambers 4, 5, 14, 15, which are disposed one above the other with respect to the plane in which the force to be damped is applied. The chambers are separated by part of the spring body 3,13 that forms a partition 7,17. Chambers 4, 5, 14, 15 are filled with liquid and connected to each other by at least one choke opening 6,16. The partition 7 comprises two sections 7a, 7b that bridge the gap on both sides of the inner tube 1 in a direction essentially transverse to the direction in which the force to be damped is applied. In the case of engine mounts, this force is usually applied in a vertical plane. The two sections 7a, 7b of the sleeve springs may have identical profiles that are arranged with mirror symmetry with respect to the force application direction A. Partition sections 7a, 7b also are stiffened in the same manner, namely, in the embodiment according to FIG. 1, by tubes 8a, 8b arranged with respect to the inner tube 1 with mirror symmetry. Tubes 8a, 8b are pressed into corresponding recesses in the subsections 7a, 7b extending parallel to the inner tube 1. The tubes preferably, but not necessarily extend along the longitudinal length of the spring. The recesses are elastically widened upon insertion of the tubes.

In the embodiment illustrated in FIG. 2, there are two reinforcement subbodies in each of the partition sections 17a, 17b. In each section, the subbodies 18a, 18b have a circular profile while the other subbodies 19a, 19b have a square profile. They also are positioned with respect to the inner tube 11 and each other with mirror symmetry and may be bonded to the sections by direct vulcanization. The reinforcement bodies 18a, 18b and 19a, 19b may be of tubular shape, may be formed from metal and may extend along the longitudinal length of the spring.

The embodiment of the sleeve spring of the invention shown in a longitudinal section corresponds in a cross sectional view taken along lines 3—3 of FIG. 1. However, in FIG. 3 the reinforcement body for the partition comprises subbodies 8a', 8b', which are disposed one behind the other along an axis parallel to the longitudinal axis of the inner tube 1 and the outer tube 2. The subbodies 8a', 8b' are pressed into blind-hole recesses of the partitions 7a, 7b. The recesses thereby are subjected to radial widening that prevents the subbodies from falling out of the recesses. The subbodies 8a', 8b' rest against the bottom of the blind-hole recesses and may be formed from steel. In this manner, long-term use with secure fixation of the subbodies to the partition is reliably assured. The subbodies 8a', 8b', may be formed as spheres, with four such spheres being illustrated in FIG. 3.

Before the sleeve spring of FIG. 3 is ready for use, the subbodies 8a', 8b' are positioned with mirror symmetry relative to the inner tube 1 in a manner similar to that shown view in FIG. 1. The subbodies 8a', 8b' are disposed in the immediate vicinity of the end faces of the sleeve spring 3. In this manner, angular and parallel displacements of the inner tube 1 relative to the outer tube 2 in the transverse direction thereby are suppressed.

What is claimed is:

1. A hydraulically damped elastic sleeve spring comprising:

(a) an inner tube;

a window tube surrounding the inner tube at a radial spacing to form a gap therebetween, said window tube including longitudinally extending cut-outs;

(c) an outer tube surrounding the window tube;
(d) a spring body adhesively connected to the inner tube and the window tube in the gap formed therebetween wherein the spring body comprises a partition forming at least two chambers disposed behind each other with respect to the direction in which force to be damped is applied;
(e) a liquid in said chambers;
(f) at least one choke opening connecting the chambers in fluid communication;
(g) said partition comprising two sections that bridge the gap on both sides of the inner tube in a direction essentially transverse to the force application direction, at least one of said two partition sections being formed with a recess disposed at a radial distance from the inner tube and the window tube; and
(h) a reinforcement body retained in said recess to stiffen said at least one of the partition sections.

2. Elastic sleeve spring according to claim 1 wherein the reinforcement body comprises a column extending parallel to the longitudinal extent of the inner tube and the outer tube.

3. Elastic sleeve spring according to claim 2 wherein said column is tubular in shape.

4. Elastic sleeve spring according to claim 1 wherein the reinforcement body is disposed in the interior of said at least one partition subsection.

5. Elastic sleeve according to claim 1 wherein subsequent to formation of said partition, said reinforcement body is pressed into said recess to elastically widen the recess and removably retain said reinforcement body.

6. Elastic sleeve spring according to claim 5 wherein said at least one partition section and the reinforcement body are adhesively connected.

7. Elastic sleeve spring according to claim 5 wherein the resiliency of the partition is adjustable by replacement of said reinforcement body with another reinforcement body of different size.

8. Elastic sleeve spring according to claim 1 wherein the reinforcement body comprises at least two subbodies disposed one behind the other along an axis parallel to the longitudinal axis of the inner tube and the outer tube.

9. Elastic sleeve spring according to claim 1 wherein each of the two partition sections is stiffened by a respective reinforcement body.

10. Elastic sleeve spring according to claim 9 wherein the partition sections and the reinforcement bodies are symmetrically disposed with respect to the direction in which the force to be damped is applied.

11. Elastic sleeve spring according to claim 7 wherein each respective reinforcement body comprises at least two subbodies disposed one behind the other along an axis parallel to the longitudinal axis of the inner tube and the outer tube.

12. Elastic sleeve spring according to claim 1 wherein said reinforcement body stiffens said at least one partition section against displacements occurring in a direction essentially transverse to the force application direction.

13. Elastic sleeve spring according to claim 1 wherein said spring body is formed of rubber.

* * * * *

UNITED STATES PATENT AND TRADEMARK OFFICE
CERTIFICATE OF CORRECTION

PATENT NO. : 4,927,123
DATED : May 22, 1990
INVENTOR(S) : Hans-Werner Schwerdt

It is certified that error appears in the above-identified patent and that said Letters Patent is hereby corrected as shown below:

Column 6, line 20, claim 11, should read:

--Elastic sleeve spring according to claim 9...--

Signed and Sealed this

Thirtieth Day of June, 1992

Attest:

DOUGLAS B. COMER

Attesting Officer

Acting Commissioner of Patents and Trademarks